(12) United States Patent
Cumbie

(10) Patent No.: US 7,229,090 B2
(45) Date of Patent: Jun. 12, 2007

(54) ATV TRAILER APPARATUS

(76) Inventor: Bobby Cumbie, 3990 Happy Valley Cir., Newnan, GA (US) 30263-5999

( * ) Notice: Subject to any disclaimer, the term of this patent is extended or adjusted under 35 U.S.C. 154(b) by 209 days.

(21) Appl. No.: 10/920,790

(22) Filed: Aug. 18, 2004

(65) Prior Publication Data

US 2006/0038384 A1  Feb. 23, 2006

(51) Int. Cl.
*B60D 1/54* (2006.01)

(52) U.S. Cl. .................... 280/491.3; 280/847

(58) Field of Classification Search ............... 280/401, 280/42, 491.1, 639, 656, 789, 491.3; 224/401; 296/182.1; 414/462
See application file for complete search history.

(56) References Cited

U.S. PATENT DOCUMENTS 4,664,051 A * 5/1987 Newkirk ................ 114/123
5,645,292 A * 7/1997 McWilliams et al. ....... 280/494
5,833,254 A * 11/1998 Bucho ..................... 280/154
6,254,117 B1 * 7/2001 Cross ...................... 280/401
6,382,486 B1 * 5/2002 Kretchman et al. ........ 224/498
D469,388 S * 1/2003 Mighell ..................... D12/101
6,557,882 B2 * 5/2003 Harrington ............... 280/415.1
6,729,636 B1 * 5/2004 Lynch et al. ............. 280/490.1
6,732,892 B1 * 5/2004 Mangrum ................. 224/401
2003/0222431 A1 * 12/2003 Crosby et al. ............. 280/656
2005/0104324 A1 * 5/2005 Richard et al. .......... 280/491.1
2006/0011754 A1 * 1/2006 Farmer ..................... 239/722

* cited by examiner

*Primary Examiner*—Tony H. Winner
(74) *Attorney, Agent, or Firm*—George Ronald Reardon

(57) ABSTRACT

A folding trailer is described, including a wheeled frame portion having a tongue secured thereto which extends forwardly for connection to the hitch of the an all-terrain vehicle (ATV). The tongue is enabled to pivot the folding trailer from a horizontal to a vertical position. The folding trailer includes an adjustable mud flap assembly, a tool holding assembly and accessory assemblies for enabling the driver of the ATV to disperse fertilizer, seed, chemicals and the like while seated in the ATV.

3 Claims, 19 Drawing Sheets

ATV TRAILER APPARATUS

BACKGROUND OF THE INVENTION

The present invention relates generally to a trailer apparatus and more particularly to an All Terrain Vehicle (ATV) utility trailer apparatus with extended versatility having transformation capability for animal transport and lawn and garden supplies, tools and equipment transport.

Traditionally, there have been various types of utility trailers have been developed for use with ATVs depending on the task to be performed. ATV trailers must be capable of successfully traversing a wide range of terrain, especially un-cleared land. ATV trailers are generally no wider than the towing ATV and must be tough enough to take substantial abuse while carrying considerable loads of non-uniform size and weight over a variety of terrains.

ATVs are commonly used for hunting and specialty trailers have been designed for removing large game from the field and returning to the camp. These trailers may not be useful in transporting a wide variety of things that may be necessary around a farm when not being used for hunting purposes. Therefore, a more versatile trailer is needed that is capable of being used as both a diversified utility work trailer and a game transport trailer, thereby making the trailer more economical.

The disclosed trailer apparatus is an improved utility trailer for all terrain vehicles. The trailer includes features which allow the trailer to be used for a variety of tasks commonly associated with ATVs around homes, farms, camps, etc. such as hauling firewood, feed, hay, fertilizer, seed, and chemicals, while improvements to the trailer further include being low to the ground, mud deflectors to prevent mud from getting on the killed game during transport over muddy terrain, attachments for tool transport, spraying devices and spreader devices, an adjustable, telescoping tongue and the ability to rotate the trailer to a roughly vertical position behind the ATV.

Previous attempts to provide for deer transport behind an ATV include U.S. Pat. No. 5,645,292, issued to McWilliams, which teaches a two wheeled trailer to be towed behind all terrain vehicle—has upright brace, includes upper and lower ends extending between each axle assembly end portion, and upper portion of corresponding trailer side. Previous attempts to provide for a more versatile ATV trailer include U.S. Pat. No. 6,557,882, issued to Harrington, which teaches an ATV) utility trailer used in hunting which has a tongue portion extended forwardly and axial and wheel assembly fixed to enclosed compartment located perpendicular to transverse walkway. Previous attempts to provide an ATV trailer that folds vertical behind the ATV include U.S. Pat. No. 6,254,117, issued to Cross which teaches a folding trailer that pivots and is secured to the ATV rack.

While these patents and other previous methods have attempted to solve the problem of loading and transporting animals and materials, none have employed tool holders, attachments for additional towing, adjustable mud flaps, or an adjustable hitching device.

Therefore, a need exists for an improved, versatile ATV trailer that has increased utility in the field, farm and at home.

The foregoing patent and other information reflect the state of the art of which the inventor is aware and are tendered with a view toward discharging the inventor's acknowledged duty of candor in disclosing information that may be pertinent to the patentability of the present invention. It is respectfully stipulated, however, that the foregoing patent and other information do not teach or render obvious, singly or when considered in combination, the inventor's claimed invention.

BRIEF SUMMARY OF THE INVENTION

The general purpose of the present invention, which will be described subsequently in greater detail, is to provide a new ATV trailer with increased versatility. The present invention is intended to be used behind an ATV or similar method of transport.

One objective of the present invention is to provide a device that can be towed behind an ATV.

Another objective of the present invention is to provide a device that can be used behind an ATV that is cost effective.

Another objective of the present invention is to provide a device that can be used behind an ATV that is easy to use.

Another objective of the present invention is to provide a device that can be used behind an ATV that can be reused many times.

Another objective of the present invention is to provide a device that can be used behind an ATV that is enabled for convenient storage.

Another objective of the present invention is to provide an assembly process for making the invention which uses readily available materials and components.

Another objective of the present invention is to provide a method for using the invention that is easy to learn.

The basis for the present invention is centered on a trailer frame enabled for towing behind an ATV.

The present invention is comprised of a frame, wheels, front hitching means that is adjustable and versatile, mud flaps that are adjustable, tool attachments, and rear hitching means.

The present invention is designed to be multifunctional. For example, a hunter is able to load a deer or any game animal by himself and transport the deer out of the woods without throwing mud all over the deer or other cargo. Additionally the hunter can also telescope the invention back away from the muffler on the ATV, which also protects cargo being hauled. The invention is designed to go anywhere an ATV can go without causing erosion to the land when going over ditches & terraces. When not in use the invention can be folded up out of the way. The invention has a simple permanent mount spring-loaded pin which serves three separate functions: one to telescope the cart in, one to telescope out and one to lock the invention in an upright position.

Similarly, the homeowner is able to use the invention at times when most ATVs are sitting idle. The invention can be used in the yard, vegetable and flower gardens to carry necessary tools, fertilizer, seed, flowers shrubs, buckets, chain saws, gas cans, garden hose and other accessories. Tools can be placed in an upright position without having to strap each individual tool down. Additionally the invention can be used to seed and fertilize a lawn or pasture in conjunction with a fertilizer/seed spreader. The invention enables the hauling of extra bags of seed and fertilizer to refill the spreader without returning to house or barn. The user can control the opening and closing of the spreader from the seat of the ATV with a lever. The invention can be used to hold a chemical sprayer instead of having the chemical sprayer strapped to the rack of the ATV. The hose holder of the invention keeps the hose away from ATVs rear tires while operating sprayer from seat of ATV.

The farmer and rancher can telescope the invention out to haul hay and to feed the livestock. Additionally, the invention can be used to carry post hole diggers, wire, chain saws, axes and other necessary equipment used to make fence repairs. The invention is enabled to be towed by an ATV to terrain that might be unable to reach by other means of transportation.

Cable, telephone and power contractors, as well as landscapers, can carry tools and equipment necessary for installation and repairs on right-of-ways or any area that has a limited access.

There has thus been outlined, rather broadly, the more important features and benefits of the invention in order that the detailed description thereof that follows may be better understood, and in order that the present contribution to the art may be better appreciated. There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Further objects and advantages of the present invention will be apparent from the following detailed description of a presently preferred embodiment which is illustrated schematically in the accompanying drawings.

BRIEF DESCRIPTION OF THE SEVERAL VIEWS OF THE DRAWING

Other advantages and features of the invention are described with reference to exemplary embodiments, which are intended to explain and not to limit the invention, and are illustrated in the drawings in which.

DETAILED DESCRIPTION OF THE INVENTION

Figure 1:
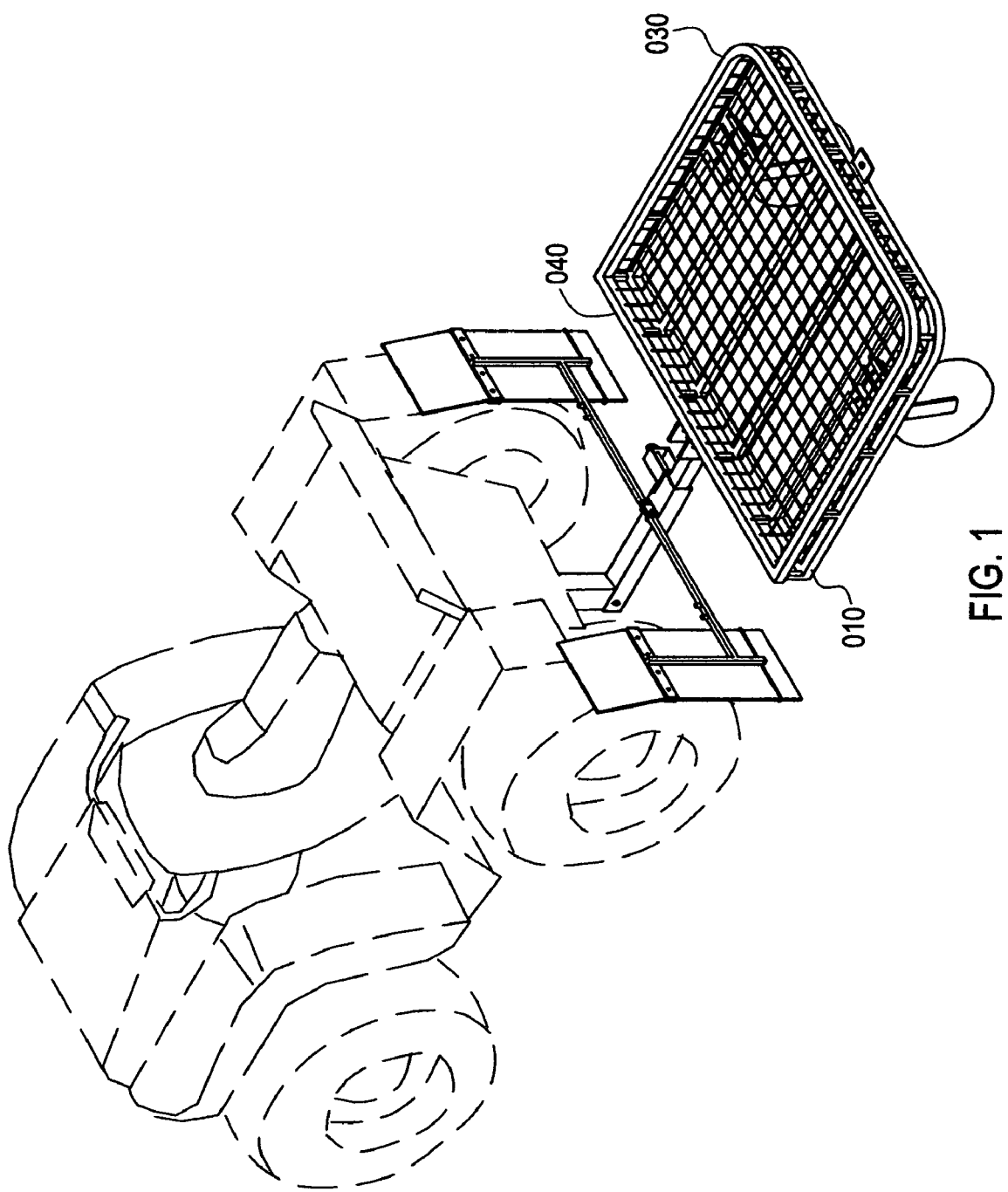
FIG. 1 is a perspective view of the invention.
Figure 2:
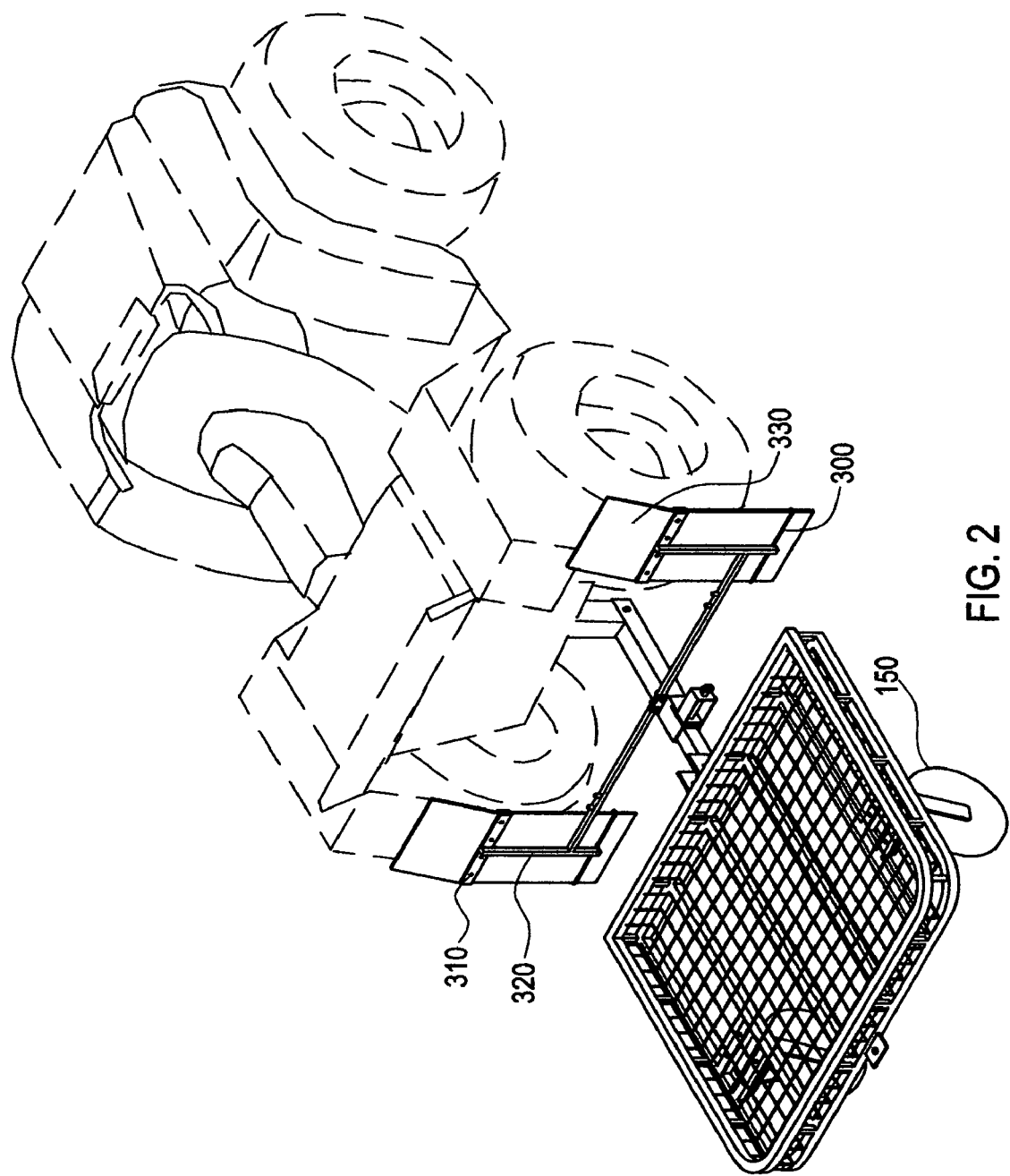
FIG. 2 is a perspective view of the invention.
Figure 3:
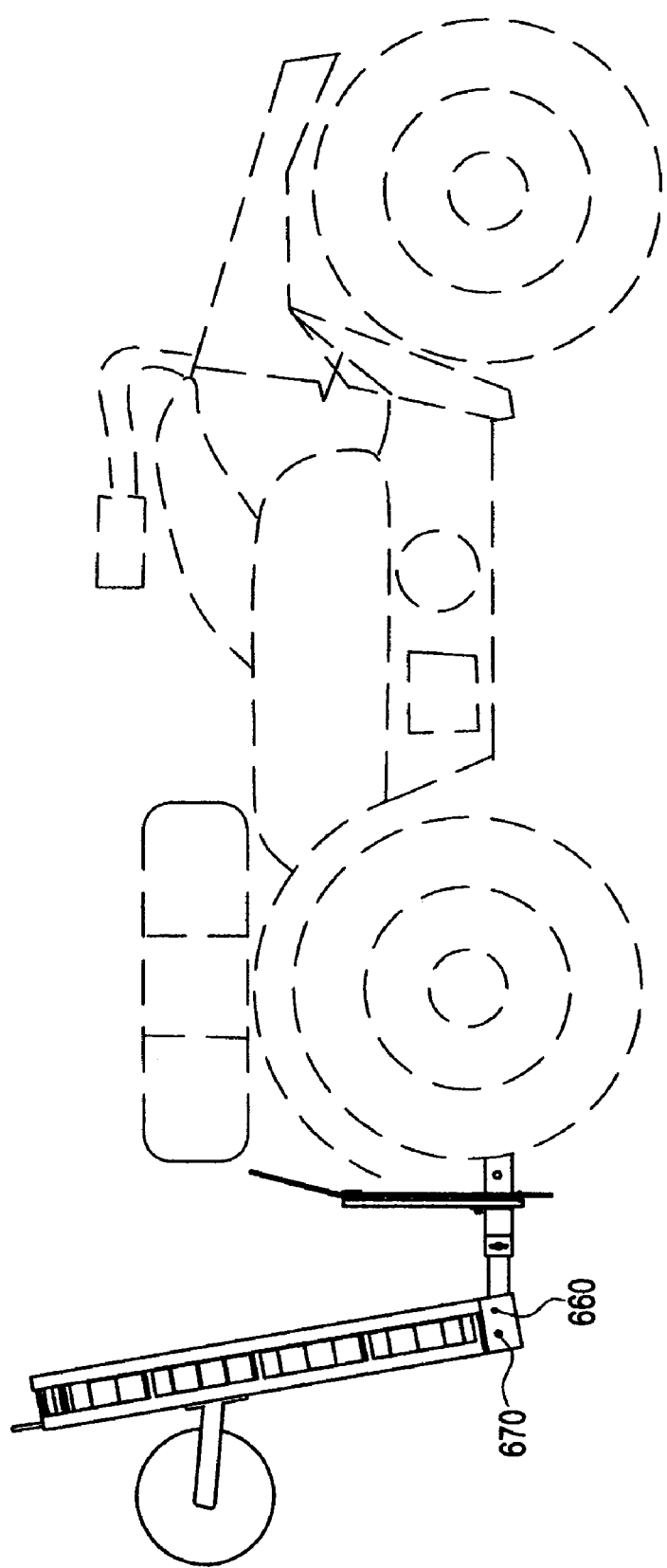
FIG. 3 is a side view of the invention.
Figure 4:
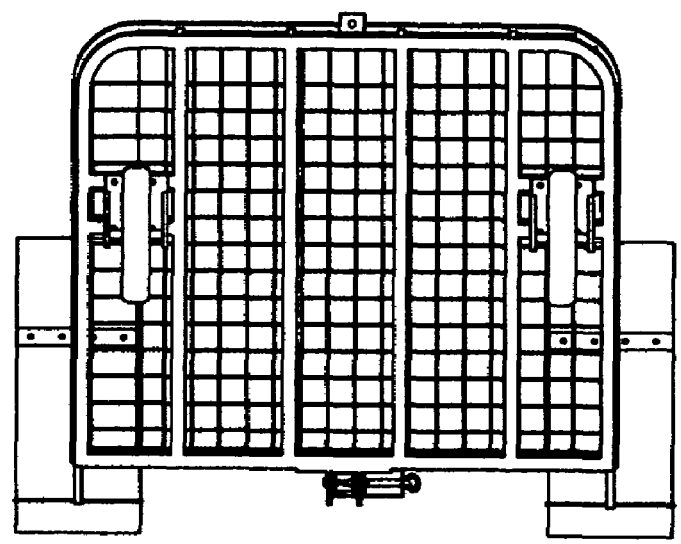
FIG. 4 is a bottom view of the invention.
Figure 5:
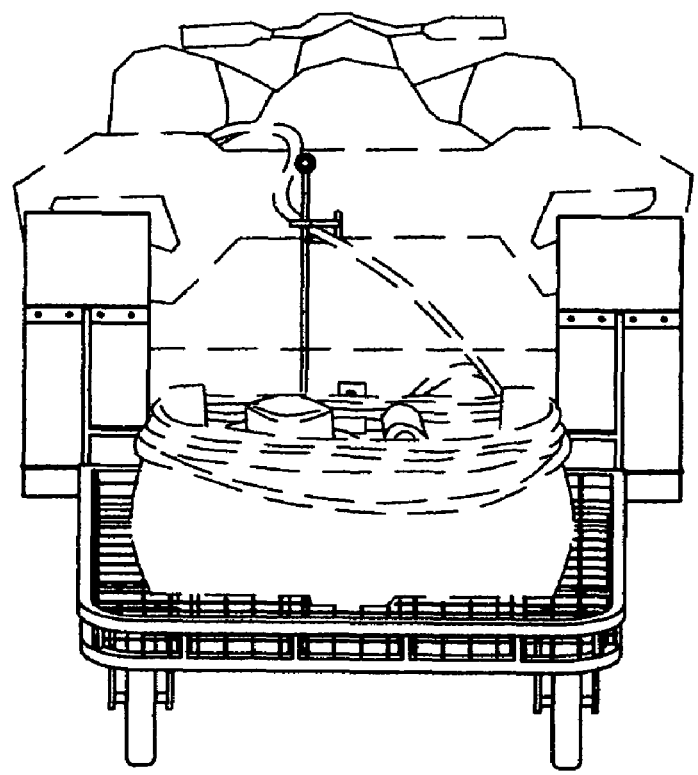
FIG. 5 is a back perspective view of the invention.
Figure 6:
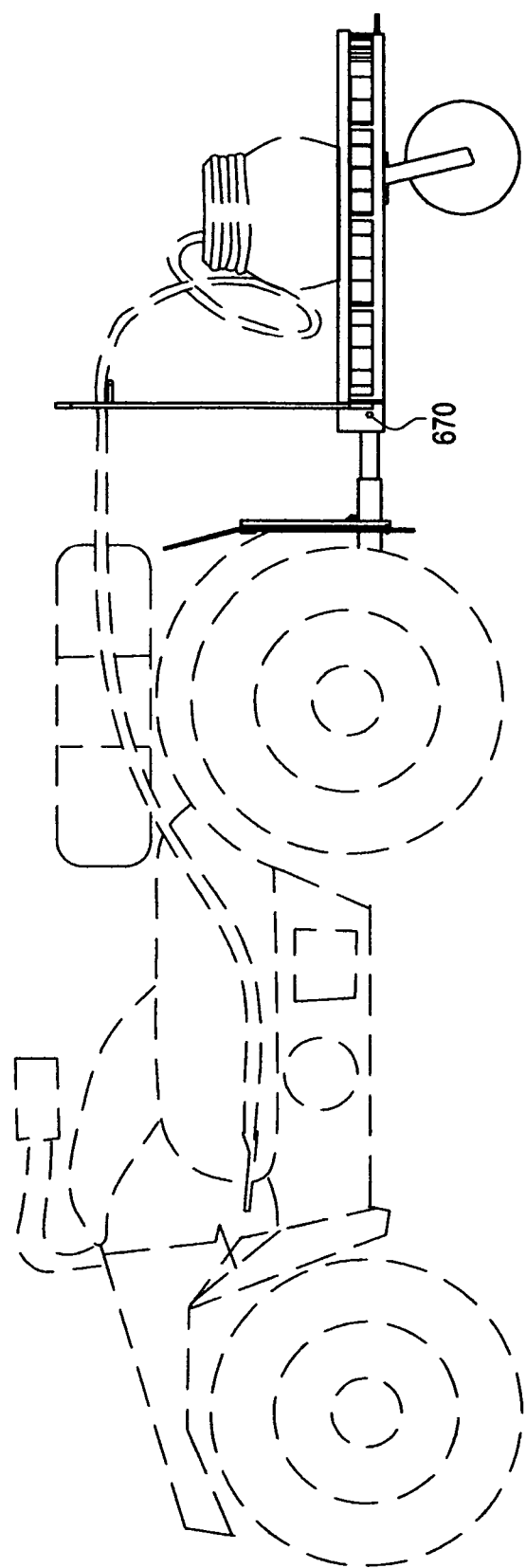
FIG. 6 is a side view of the invention.
Figure 7:
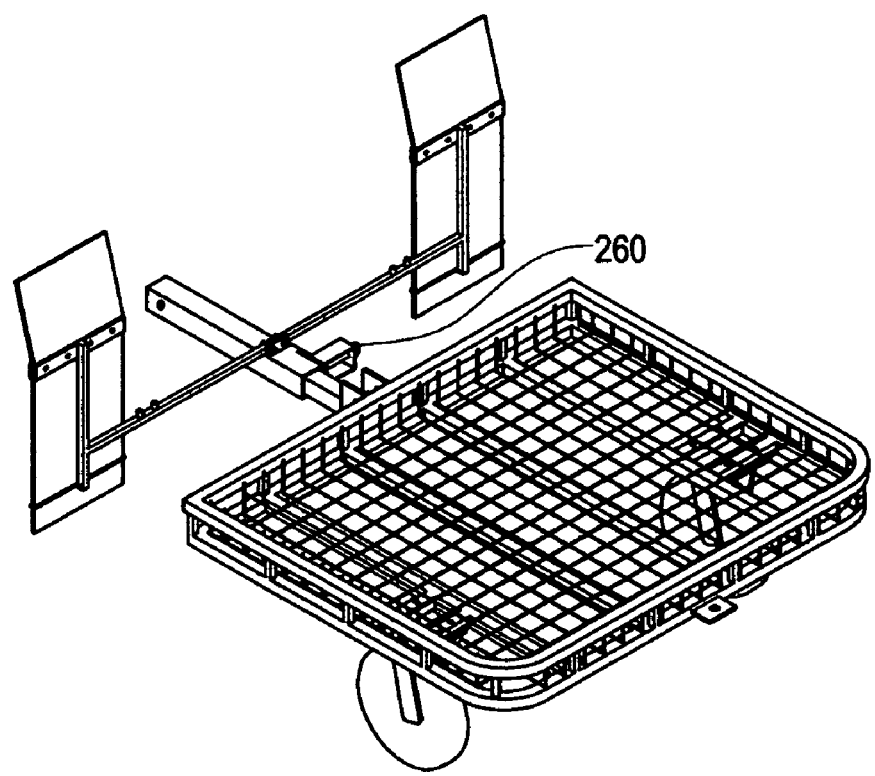
FIG. 7 is a perspective view of the invention.
Figure 8:
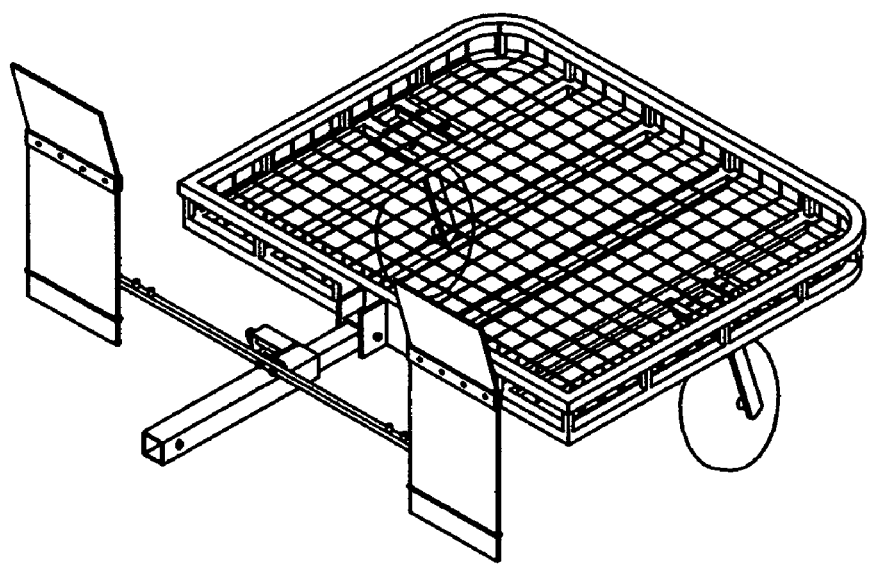
FIG. 8 is a perspective view of the invention.
Figure 9:
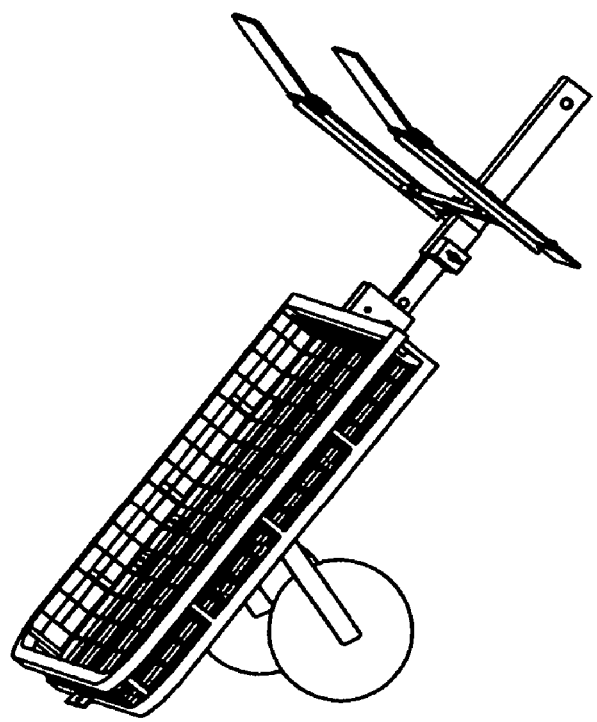
FIG. 9 is a perspective view of the invention.
Figure 10:
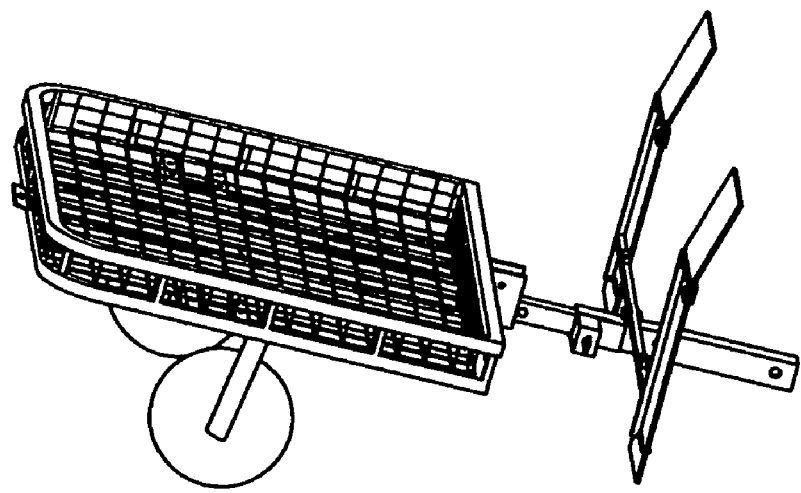
FIG. 10 is a perspective view of the invention.
Figure 11:
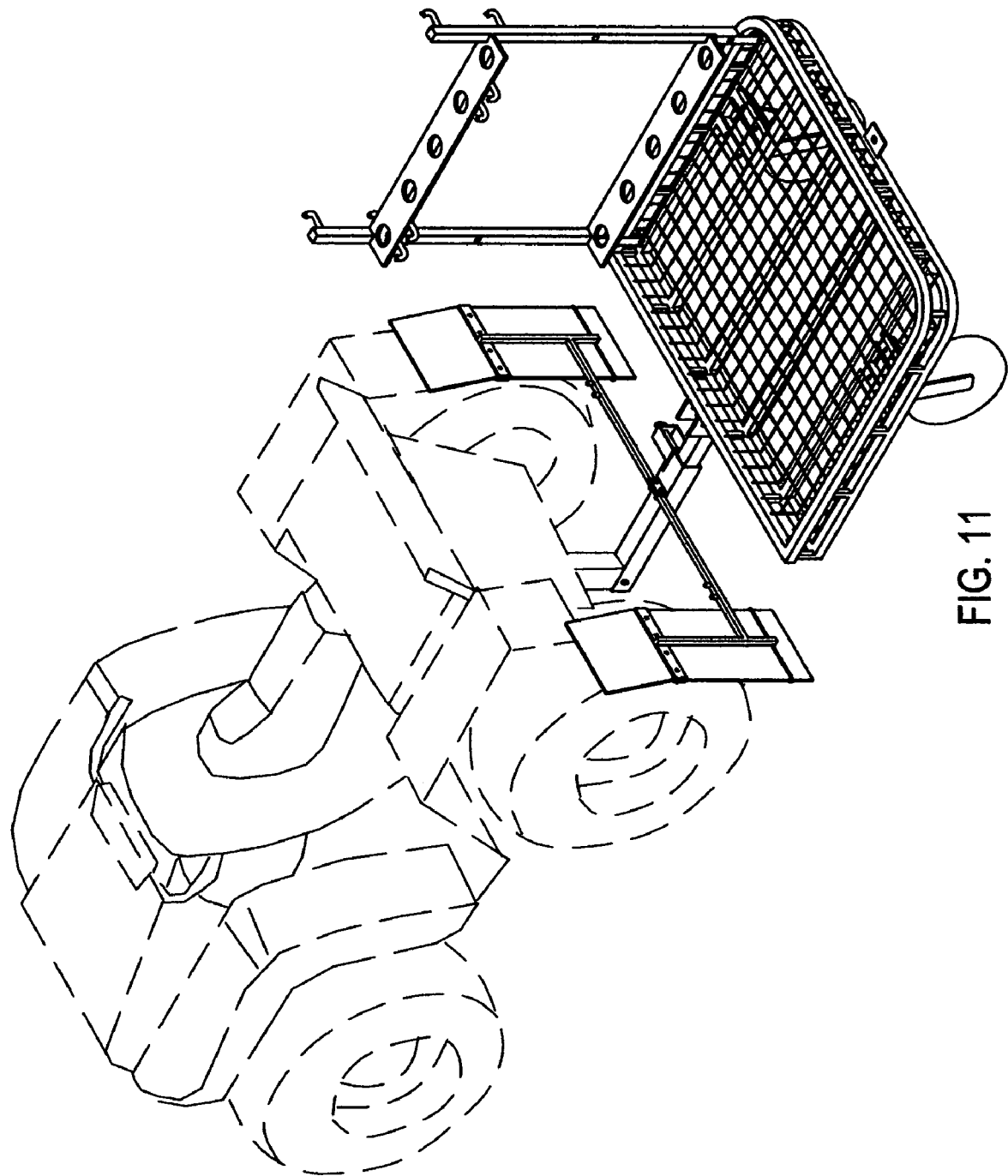
FIG. 11 is a perspective view of the invention.
Figure 12:
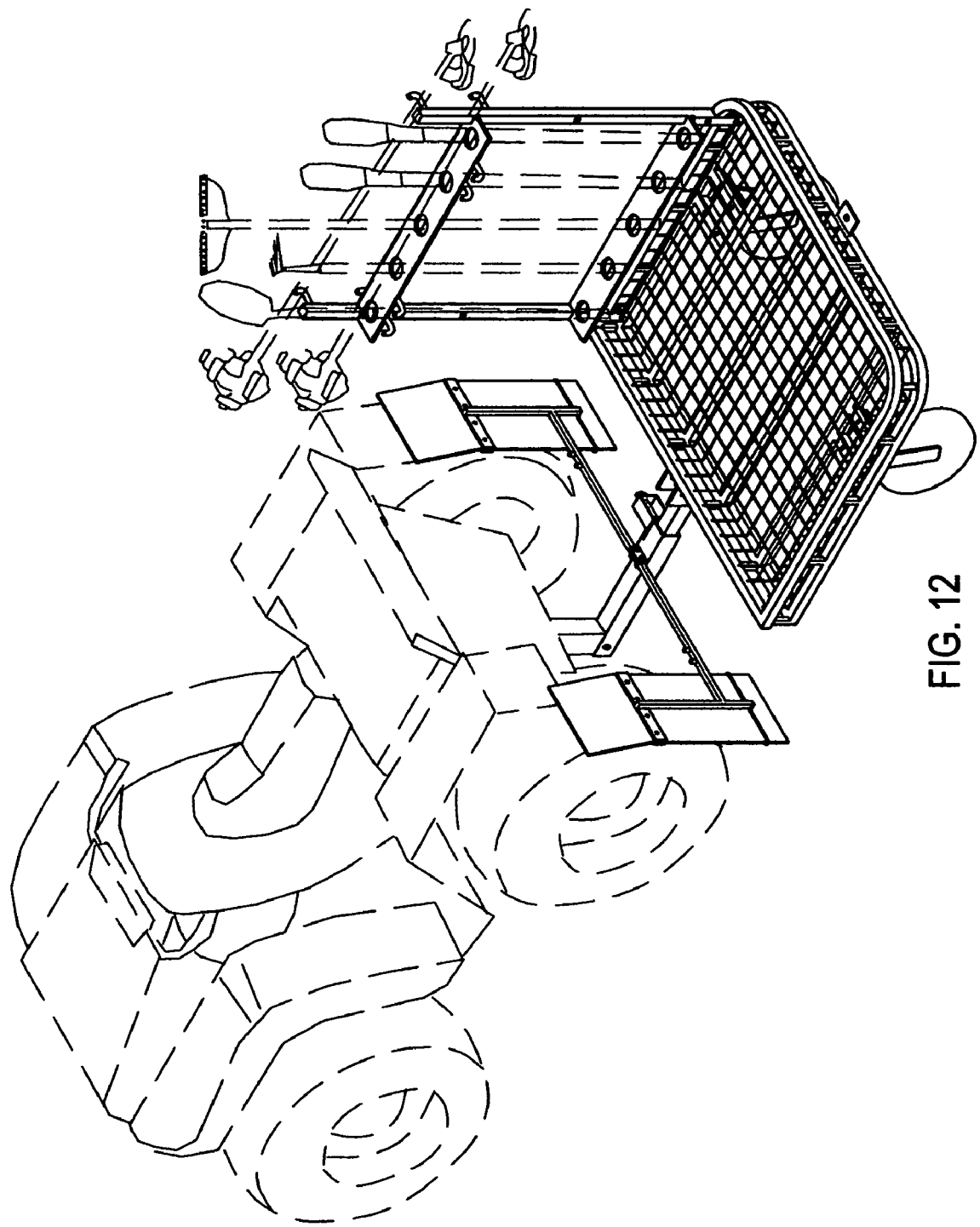
FIG. 12 is a perspective view of the invention.
Figure 13:
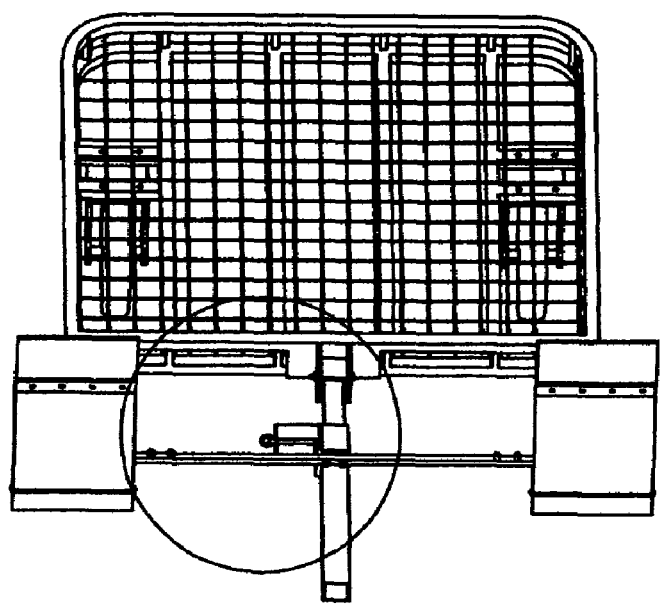
FIG. 13 is a front perspective view of the invention.
Figure 14:
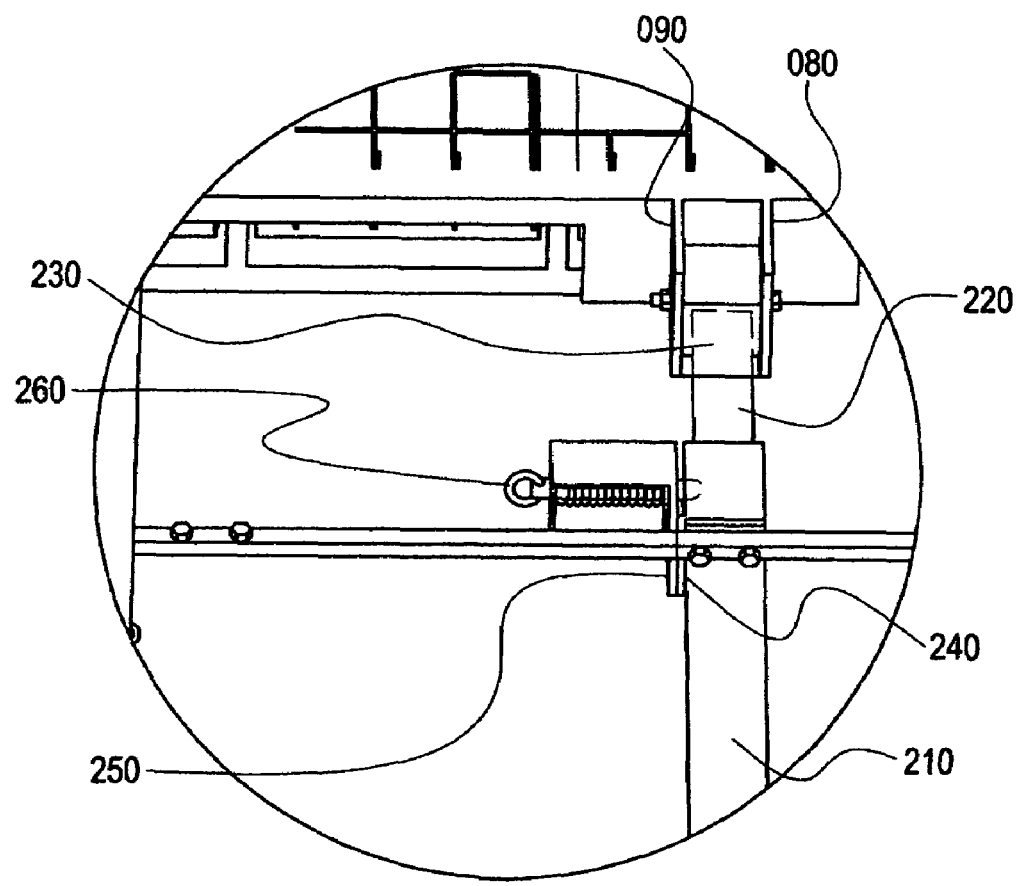
FIG. 14 is an exploded view of the invention.
Figure 15:
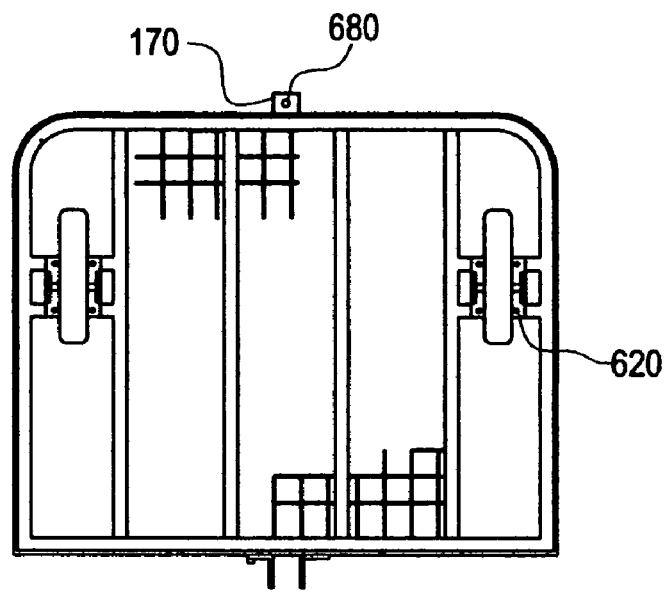
FIG. 15 is a bottom view of the invention.
Figure 16:
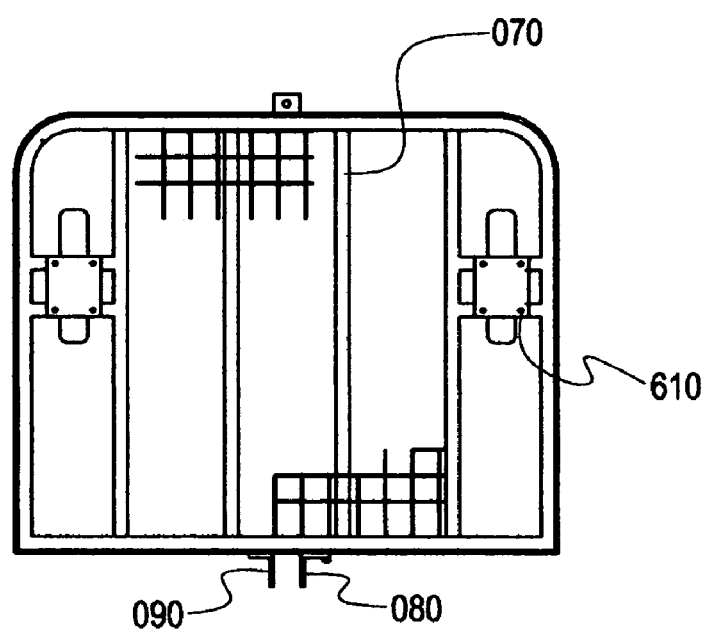
FIG. 16 is a bottom view of the invention.
Figure 17:
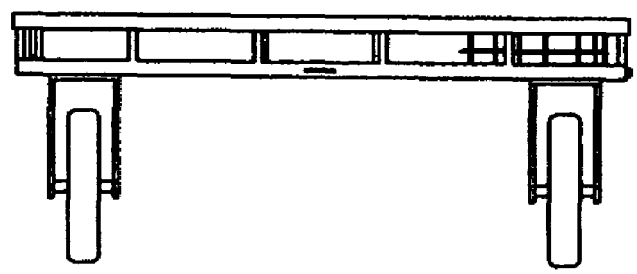
FIG. 17 is a back view of the invention.
Figure 18:
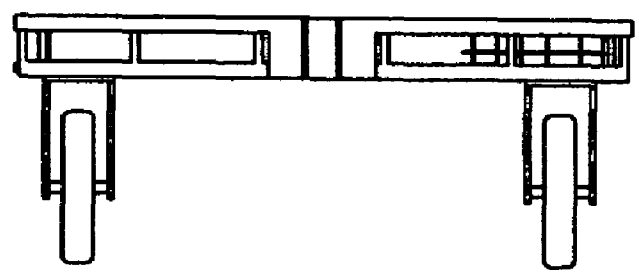
FIG. 18 is a front view of the invention.
Figure 19:
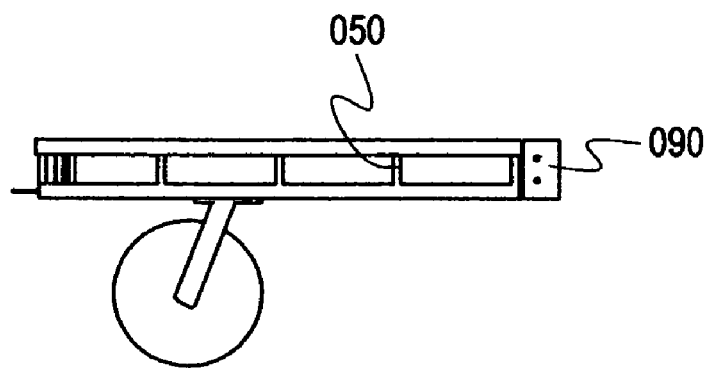
FIG. 19 is a right side view of the invention.
Figure 20:
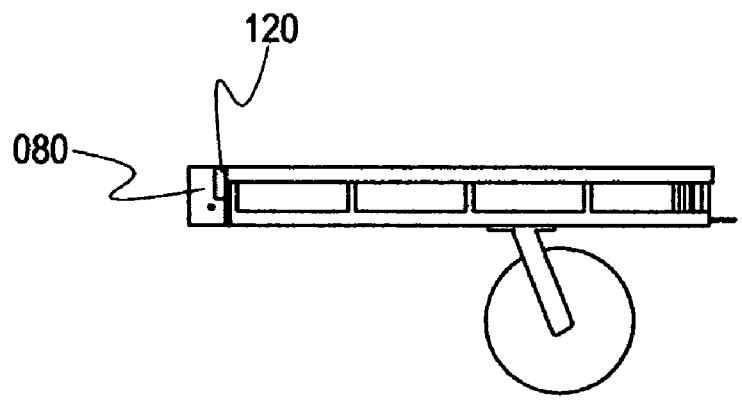
FIG. 20 is a left side view of the invention.
Figure 21:
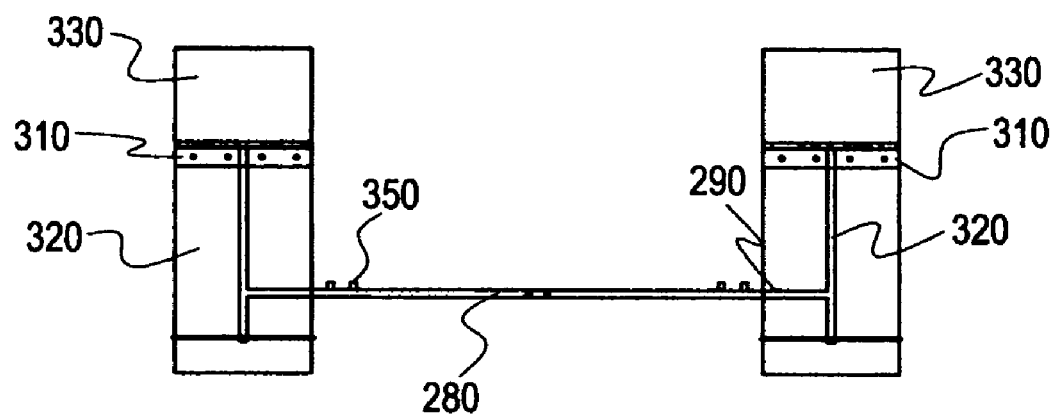
FIG. 21 is a view of the mud flap assembly portion of the invention.
Figure 22:
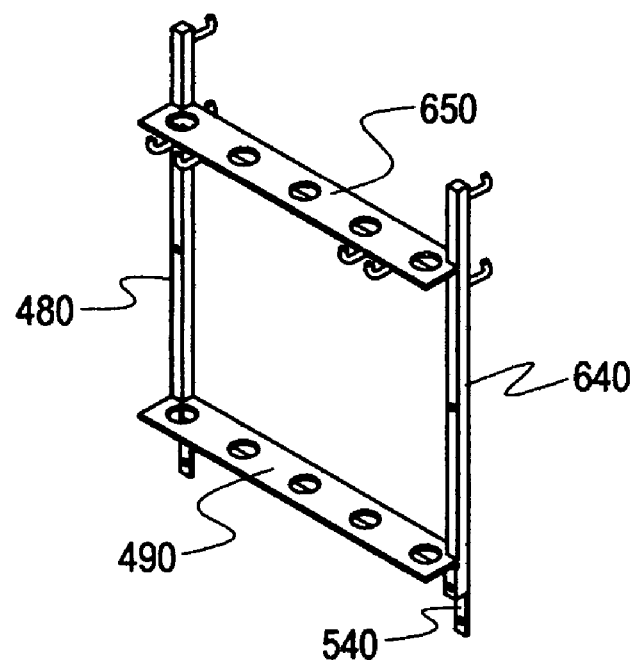
FIG. 22 is a view of the tool holder assembly portion of the invention.
Figure 23:
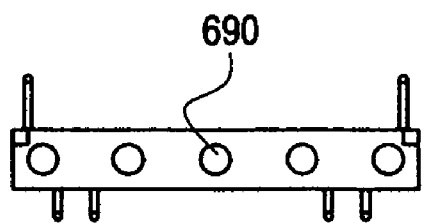
FIG. 23 is a top view of the tool holder assembly portion of the invention.
Figure 24:
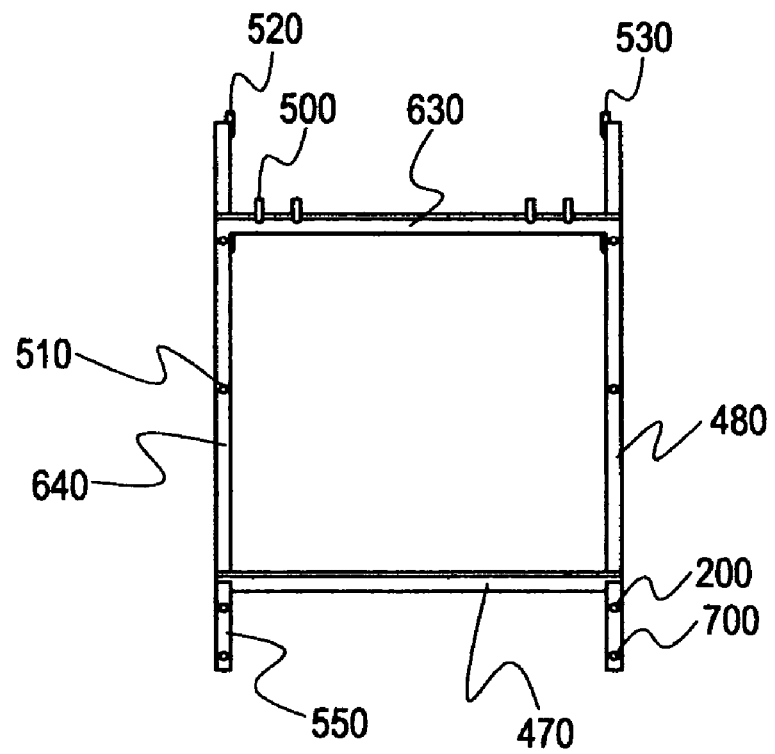
FIG. 24 is a front view of the tool holder assembly portion of the invention.
Figure 25:
FIG. 25 is a front view of the hose holder assembly of the invention.
Figure 26:
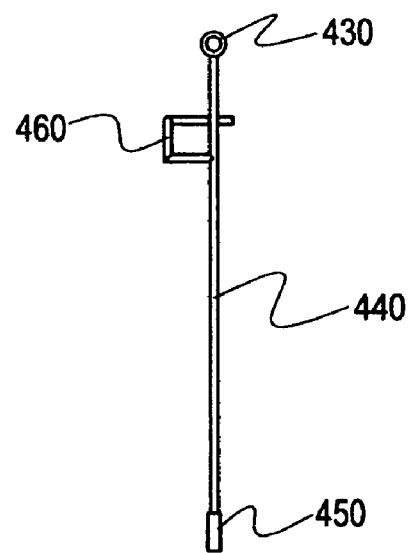
FIG. 26 is an back view of the hose holder assembly of the invention.
Figure 27:
FIG. 27 is a top view of the hose holder assembly of the invention.
Figure 28:
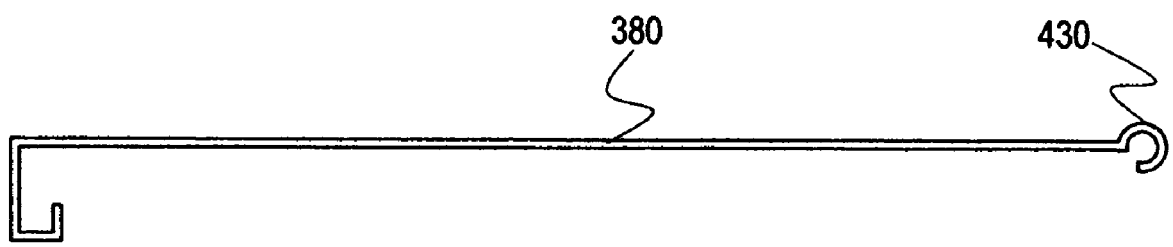
FIG. 28 is a side view of the spreader attachment of the invention.
Figure 29:
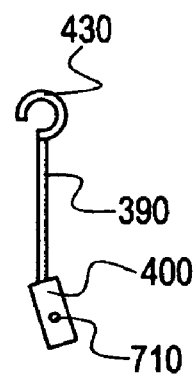
FIG. 29 is a side view the spreader attachment of the invention.
Figure 30:
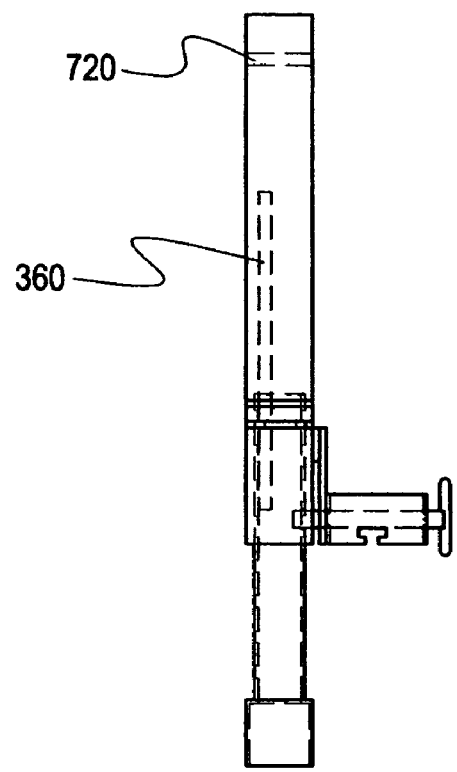
FIG. 30 is a top view of the hitch assembly portion of the invention, in extended position.
Figure 31:
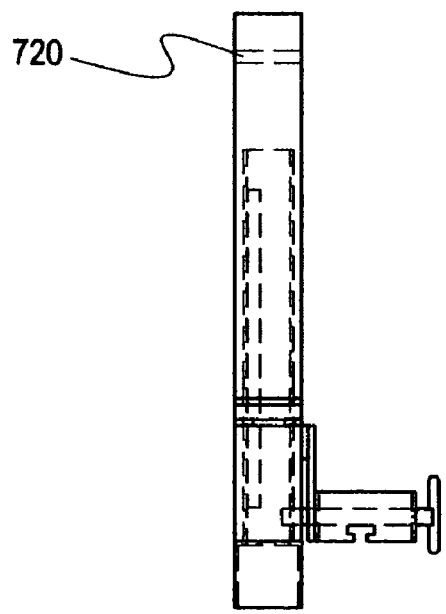
FIG. 31 is a top view of the hitch assembly portion of the invention, in retracted position.
Figure 32:
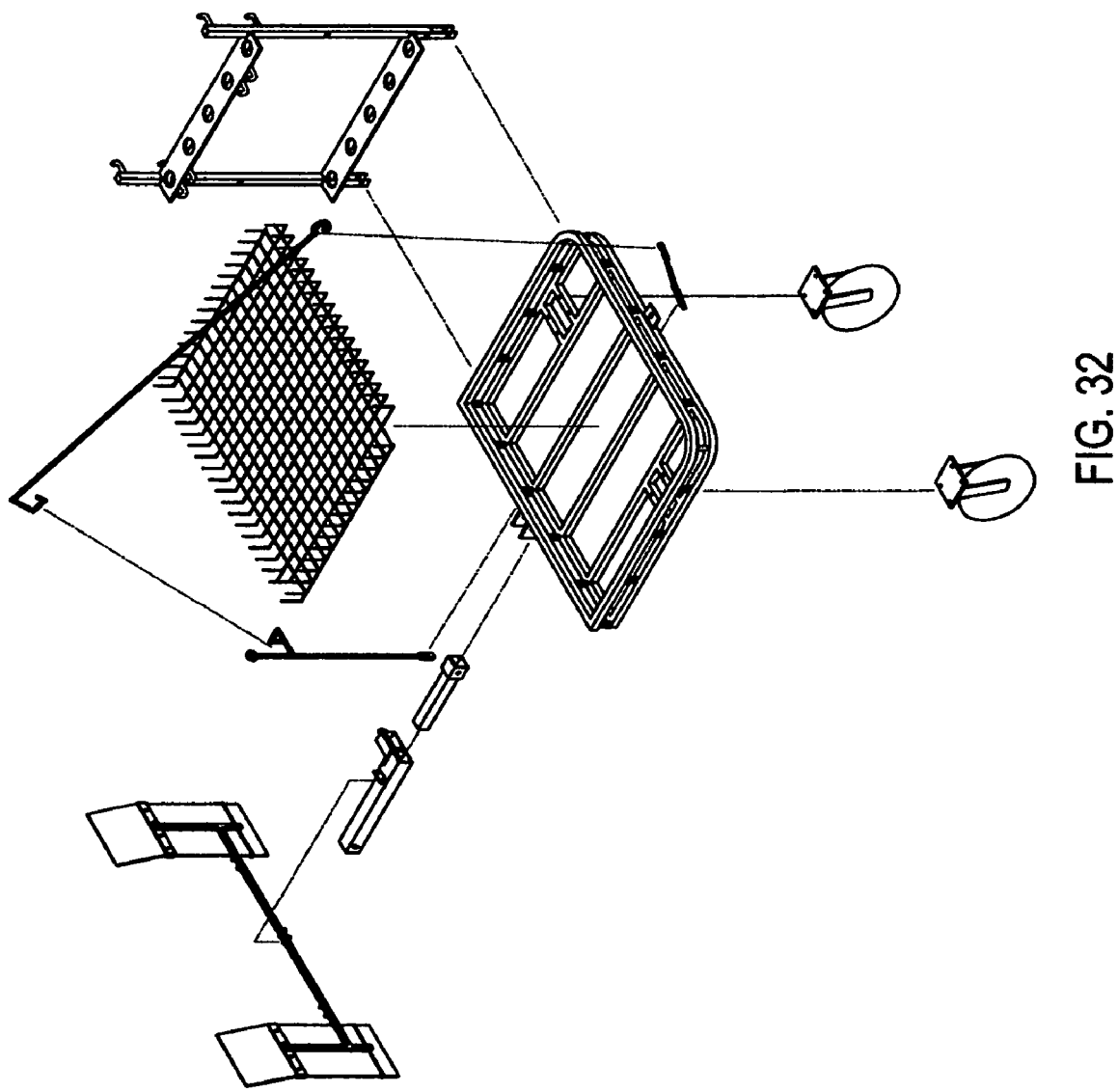
FIG. 32 shows the major parts of the invention.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The invention is centered on a selectively foldable ATV utility trailer comprising:

1) a frame portion having a forward end, a rearward end, opposite sides, an upper end, flooring, and a lower end, wherein said lower end is offset from said upper end;
2) a first wheel assembly and a second wheel assembly, securely attached to the bottom of said first frame portion, wherein said first wheel assembly and said second wheel assembly have 360° horizontal pivotal means that allows the selectively foldable ATV utility trailer to maneuver inline with the ATV (tracks with the ATV for both forward and reverse directions);
3) a slidably adjustable, elongated tongue member, having ATV securing means, wherein said tongue member has pivotal securing means about a vertical axis transverse to the longitudinal axis of said tongue member wherein said frame portion is selectively in ground-engagement to a substantially vertically disposed position rearwardly of the ATV; and
4) a rear trailer hitch attaching means.
5) The invention is further comprised of an adjustable mud flap assembly, a releasably attached tool holder assembly and a releasably attached spreader assembly.

The preferred embodiment of the invention is made as follows:

1) Weld the Bottom Front Frame, 020, to the Bottom Frame, 010.
2) Weld the Front Top Rail, 040, to the Top Rail, 030.
3) Weld the Post, 050, to the welded combination of the Top Rail, 030, and the Front Top Rail, 040.
4) Weld the Post, 050, to the welded combination of the Bottom Frame, 010, to the Bottom Front Frame, 020.
5) Weld the Flooring with the Four Side Inserts, 060, to the welded combination of the Top Rail, 030, the Front Top Rail, 040 and welded combination of the Bottom Frame, 010 and the Bottom Front Frame 020.
6) Weld the Cross Members, 070, to welded combination of the Bottom Frame, 010, and the Bottom Front Frame, 020.
7) Weld the Front Frame Spacer, 110, to the Bottom Front Frame, 020.
8) Weld the Right Tongue Bracket, 090, to the Front Top Rail, 040, and the Right Front Frame Spacer, 110A.
9) Weld the Left Tongue Bracket, 080, to the Front Top Rail, 040, and the Left Front Frame Spacer, 110B.
10) Weld the Fertilizer Spreader Lever/Chemical Hose Holder Bracket, 120, to the Left Tongue Bracket, 080.
11) Weld the Thumb Screw Nut, 130, to the Fertilizer Spreader Lever/Chemical Hose Holder Bracket, 120.
12) Attach the Thumb Screw, 140, to the Thumb Screw Nut, 130, by threading.
13) Weld the Wheel Mounting Bracket, 160, to the Cross Members, 070, and the Bottom Frame, 010.
14) Attach the Wheel Assembly, 150, to the Wheel Mounting Bracket, 160, using the Bolt, 610, and the Lock Nut, 620 by threading.
15) Weld the Rear Trailer Hitch, 170, to the Bottom Frame, 010.
16) Weld a Tool Holder Mounting Nut, 180, to the front right side of the Frame, 010.
17) Weld a Tool Holder Mounting Nut, 180, to the rear right side of the Frame, 010.
18) Slide the Internal Tongue, 220 inside the External Tongue, 210, and keep in place by the Pin, 370, and weld to the Internal Tongue, 220.
19) The Pin, 370, travels in the Slot, 360.
20) Slide the Internal Tongue, 220 inside the Collar, 230 and weld.
21) Install the Internal Tongue, 220, and the Collar, 230, into the Left Tongue Bracket, 080, and the Right Tongue Bracket, 090, using the Bolt, 560, the Lock Washer, 580 and the Nut, 570.
22) Weld the Spring Lock Bracket Spacer, 240, to the External Tongue, 210.
23) Weld the Spring Lock Mounting Plate, 250 to the Spring Lock Bracket Spacer, 240.
24) Weld the Spring Locking Pin, 260, to the Spring Lock Mounting Plate, 250.
25) Weld the Mud Flap Bracket, 270 to the External Tongue, 210.
26) Attach the Mud Flap Frame, 280, to the Mud Flap Bracket, 270 using the Bolt, 590, and the Lock Nut, 600 by threading.
27) Weld the Set Screw Holder, 340, to the Mud Flap Frame, 280.
28) Attach the Set Screw, 350, to the Set Screw Holder, 340, by threading.
29) Attach the Mud Flap Adjusting Rod, 290, to the Mud Flap Frame, 280 using the Set Screw, 350.
30) Weld the Vertical Mud Flap Brace, 320 to the Mud Flap Adjusting Rod, 290.
31) Weld the Mud Flap Guide, 300, to the Vertical Mud Flap Brace, 320.
32) Weld the Mud Flap Top Mounting Bracket, 310, to the Vertical Mud Flap Brace, 320.
33) Attach the Mud Flap, 330, to the Mud Flap Top Mounting Bracket, 310, using the Mud Flap Retaining Bolt, 790, and the Mud Flap Retaining Nut, 800.
34) Weld the Horizontal Fertilizer Spreader Lever, 380, to the Eye Bolt, 430.
35) Weld the Vertical Fertilizer Spreader Lever, 390, to the Eye Bolt, 430.
36) Attach the Vertical Fertilizer Spreader Lever, 390, to the Horizontal Fertilizer Spreader Lever, 380 using the Eye Bolt, 430.
37) Weld the Vertical Fertilizer Spreader Lever, 390, to the Fertilizer Spreader Handle Connector, 400.
38) Weld the Set Screw Holder, 410, to the Fertilizer Spreader handle Connector, 400.
39) Attach the Thumb Screw, 420, to the Set Screw Holder, 410, by threading.
40) Attach the Fertilizer Spreader Lever/Chemical Hose Holder, 450, to the Fertilizer Spreader Lever/Chemical Hose Holder, 440, by welding.
41) Insert the Fertilizer Spreader Lever/Chemical Hose Holder, 450, into the Fertilizer Spreader Lever/Chemical Hose Holder Bracket, 120.
42) Attach the Thumb Screw, 140, to the Thumb Screw Nut, 130, by threading.
43) Weld the Fertilizer Spreader Lever/Chemical Hose Holder, 440, to the Fertilizer Spreader Lever/Chemical Hose Insert, 450.
44) Weld the Hose Holder, 460, to the Fertilizer Spreader Lever/Chemical Hose Holder, 440.
45) Weld the Eye Bolt, 430 to the Fertilizer Spreader Lever/Chemical Hose Holder, 440.
46) Weld the Tool Holder Horizontal Frame, 470, to the Tool Holder Vertical Frame, 480, and the Tool Holder Rear Vertical Frame, 640.
47) Weld the Tool Holder Top Horizontal Frame, 630, to the Tool Holder Vertical Frame, 480, and the Tool Holder Rear Vertical Frame, 640.
48) Weld the Tool Holder Bottom Bracket, 490, to the Tool Holder Horizontal Frame, 470.
49) Weld the Tool Holder Top Bracket, 650, to the Tool Holder top Horizontal Frame, 630.
50) Weld the Hose/Drop Cord Holder, 500, to the Tool Holder Top Bracket, 650.
51) Attach the Eye Bolt, 510, to the Tool Holder Rear Vertical Frame, 640, and the Tool Holder Vertical Frame, 480 by threading.
52) Weld the Weed Eater Holder Rear Bracket, 520, to the Tool Holder Rear Vertical Frame, 640.
53) Weld the Weed Eater Holder Front Bracket, 530, to the Tool Holder Vertical Frame, 480.

The preferred method of using the invention is comprised of the following steps.

1) To connect the trailer assembly, 820, to an ATV, align the trailer assembly, 820, directly behind ATV with the tongue assembly, 810, lowered toward the ground.
   a) Continue rolling the trailer assembly, 820, toward the ATV until the top portion of the mud flaps, 330, go underneath the fender extensions on the ATV.
   b) Raise the trailer assembly, 820, up and align the front part of the tongue assembly, 810, with the tongue receiver of the ATV and slide the tongue assembly, 810, inside the tongue receiver of the ATV until the ⅝" hole on the tongue receiver of the ATV and the tongue assembly, 810, align, then insert the ⅝" receiver pin, 750, and insert the Retaining Clip, 760.

2) To telescope out the tongue assembly, 810, pull out the ⅝" spring locking pin, 260, and pull the trailer assembly, 820, rearward until it stops, then release the spring locking pin, 260, locking the tongue assembly, 810, in place.
3) To telescope in the tongue assembly, 810, pull out the ⅝" pin spring locking pin, 260, slide the trailer assembly forward and then release spring locking pin, 260.
4) To raise trailer assembly into an upright position, such as, but not limited to, when not in use, pull out the spring locking pin, 260, raise the trailer assembly, 820, up to approximately a 90 degrees vertical position and release the spring locking pin, 260, thus locking the trailer assembly in an upright position.
5) To lower the trailer assembly, 820, to the ground, pull out the ⅝" spring locking pin, 260, lower the trailer assembly, 820, to the ground and release the spring locking pin, 260.
6) To use the fertilizer/seed spreader:
a) Align spreader behind the rear of the trailer assembly
b) Connect the tongue of the spreader to the rear trailer hitch, 170, with the Rear Hitch Pin, 770, and Rear Hitch Pin, 780, through the Rear Trailer Hitch Pin Hole, 680.
c) To connect the spreader lever assembly, 830, to the trailer assembly, 820, and spreader:
 i) Hold the spreader lever assembly, 830, horizontal with the spreader and the trailer assembly, 820.
 ii) Take the vertical hose and lever bracket with the hose holder facing forward,
 iii) Insert handle into eye bolt of hose holder,
 iv) Run eye bolt through handle of main lever
 v) Insert into the spreader lever/chemical hose holder, 440, mounted on the lever with the ¹⁄₁₆"×¼"×¼" rectangle tubing, slide over the lever on the spreader in the off position—the short end of the lever will be angled toward the back.
 vi) Tighten the Thumb Screw, 420.
7) To use the chemical sprayer:
 a) Remove the spreader, if installed.
 b) Remove clip, 780, and ½" pin, 770, and pull spreader aside.
 c) Remove main lever assembly, 380, from the chemical sprayer holder.
 d) Then re-insert chemical hose holder and tighten with ¼" thumb screw, with the hose holder, 460, being on the left side.
 e) Put the chemical spray container inside the trailer assembly, 820.
 f) Connect the wiring connector to ATV.
 g) Take hose run on left side and wrap hose around to front and right side of the Hose Holder, 460.
 h) Insert 440 into the Chemical Hose Holder Bracket, 120.
 i) Pull hose around front allowing hose to rest in Hose Holder Bracket, 460.
8) To remove the hose and chemical sprayer, just reverse this procedure.
9) To install the tool tote:
 a) Face the right side of the tool holder assembly, 840, and the right side of the trailer assembly, 820.
 b) Lift up the tool holder assembly, 840
 c) Place ¼"×1"×4" Flat Bar Mounting Guide, 540, on inside of Right Side Top Rail, 030.
 d) Place ¼"×1"×5" Flat Bar Mounting Plate, 550, on outside of the Right Side Top Rail, 030, of the Trailer Assembly, 820.
 e) Slide the tool holder assembly, 840, over the top rail, 030, aligning the ⅜" holes of the ¼"×1"×5" Flat Bar Mounting Plate, 550, with the ⅜" nuts, 180, welded in the right side of the bottom frame, 010.
 f) Insert ⅜"×1½" Wing Nuts With Plastic Handles, 190, and tighten securely.
 g) (An alternate securing system is to take ¼"×2" Cotterless Hitch, 200, place in the Right Side Cotterless Hitch Hold, 730, on outside mounting plate, 550, pushing under top rail, 030, and through the Inside Cotterless Hitch Hole, 740, on the inside guide plate, 540.)
10) To remove tool holder assembly, 840, from trailer assembly, 820, just reverse this procedure.

To use the invention to load a deer:
1) With cart in upright position, release the ⅝" spring lock pin, 260.
2) Lower the back bottom of the cart to the ground.
3) Pull cart back in order to telescope out and release the spring lock pin, 260.
4) Pull ATV past the deer, stopping cart directly in front of the deer.
5) Grab deer by the antlers or front legs and pull deer until it rests inside the cart.
6) If desired, tie deer head to ATV cart to keep the deer head from dragging the ground.

The specifications for the preferred embodiment of the invention are as follows:

| PART NUMBER | PART NAME | SPECIFICATIONS |
| --- | --- | --- |
| 010 | Bottom Frame | 1/8" × 1" × 1" Square Tubing/w 2 90° Bends |
| 020 | Bottom Front Frame | 1/8" × 1" × 1" Square Tubing |
| 030 | Top Rail | 1/8" × 1" × 1" Square Tubing/w 2 90° Bends |
| 040 | Front Top Rail | 1/8" × 1" × 1" Square Tubing |
| 050 | Post | 1/16" × 3/4" × 3/4" Square Tubing |
| 060 | Flooring/w 4 Side Inserts | 20 Gauge 1/2" Expanded Metal/w Break all 4 Sides |
| 070 | Cross Members | 1/8" × 1" × 1" Square Tubing |
| 080 | Left Tongue Bracket | 1/4" × 2 1/2" × 2 1/2" Angle |
| 090 | Right Tongue Bracket | 1/4" × 2 1/2" × 2 1/2" Angle |
| 110A | Right Front Frame Spacer | 1/4" × 1" × 2 1/2" Flat Bar |
| 110B | Left Front Frame Spacer | 1/4" × 1" × 2 1/2" Flat Bar |
| 120 | Fertilizer Spreader Lever/Chemical Hose Holder Bracket | 1/16" × 3/4" × 3/4" Square Tubing |
| 130 | Thumb Screw Nut | 5/16" Nut |
| 140 | Thumb Screw | 5/16" × 3/4" |
| 150 | Wheel Assembly | Wheel Assembly 10" Pneumatic Swivel Caster Wheels 4.10/3.50–4 Max. 500 lb. |
| 160 | Wheel Mounting Bracket | 1/8" × 1" × 1" |
| 170 | Rear Trailer Hitch | 1/4" × 1 3/4" × 2" Flat Bar/w 5/8" Hole |
| 180 | Tool Holder Mounting Nut | 3/8" Nut |
| 190 | Wing Nut | 3/8" × 1 1/2" (Plastic Handle) |
| 200 | Cotterless Hitch | 1/4" × 2" |
| 210 | External Tongue | 1/4" × 2" × 2" Square Tubing |
| 220 | Internal Tongue | 1/4" × 1 1/2" × 1 1/2" Square Tubing |
| 230 | Collar | 1/4" × 2" × 2" Square Tubing |
| 240 | Spring Lock Bracket Spacer | 1/4" × 1 1/2" Flat Bar |
| 250 | Spring Lock Mounting Plate | 1/4" × 1 1/2" Flat Bar |
| 260 | Spring Locking Pin | 5/8" |
| 270 | Mud Flap Bracket | 1/16" × 3/4" × 3/4" Angle |
| 280 | Mud Flap Frame | 1/16" × 3/4" × 3/4" Square Tubing |
| 290 | Mud Flap Adjusting Rod | 1/2" Square Stock |

-continued

| PART NUMBER | PART NAME | SPECIFICATIONS |
|---|---|---|
| 300 | Mud Flap Guide | 1/4" Round Stock |
| 310 | Mud Flap Top Mounting Bracket | 1/16" × 1/2" Flat Bar |
| 320 | Vertical Mud Flap Brace | 1/2" Square Stock |
| 330 | Mud Flap | 3/16" Flexible Plastic |
| 340 | Set Screw Holder | 1/4" Nut |
| 350 | Set Screw | 1/4" × 1/2" Bolt |
| 360 | Slot | 1/4" × 3/8" × 9 5/8" |
| 370 | Pin | 3/8" × 1 5/8" |
| 380 | Horizontal Fertilizer Spreader Lever | 5/16" Round Stock |
| 390 | Vertical Fertilizer Spreader Lever | 5/16" Round Stock |
| 400 | Fertilizer Spreader Handle Connector | 1/16" × 1/4" × 1 1/4" Rectangle Tubing |
| 410 | Set Screw Holder | 1/4" Nut |
| 420 | Thumb Screw | 1/4" × 3/4" |
| 430 | Eye Bolt | 5/16" × 1/2" |
| 440 | Fertilizer Spreader Lever/Chemical Hose Holder | 5/16" Round Stock, 25" long |
| 450 | Fertilizer Spreader Lever/Chemical Hose Insert | 1/16" × 1/2" × 1/2" Square Tubing |
| 460 | Hose Holder | 5/16" Round Stock |
| 470 | Tool Holder Horizontal Frame | 1/8" × 1" × 1" Square Tubing |
| 480 | Tool Holder Vertical Frame | 1/8" × 1" × 1" Square Tubing |
| 490 | Tool Holder Bracket - Bottom | 1/4" × 2 1/2" Flat Bar |
| 500 | Hose/Drop Cord Holder | 5/16" Round Stock |
| 510 | Eye Bolt | 1/4" × 1 1/2" |
| 520 | Weed Eater Holder - Rear Bracket | 5/16" Round Stock |
| 530 | Weed Eater Holder - Front Bracket | 5/16" Round Stock |
| 540 | Inside Mounting Guide For Tool Tote | 1/4" × 1" × 4" Flat Bar |
| 550 | Outside Mounting Plate For Tool Tote | 1/4" × 1" × 5" Flat Bar |
| 560 | Bolt | 1/2" × 3 1/2" |
| 570 | Nut | 1/2" |
| 580 | Lock Washer | 1/2" |
| 590 | Bolt | 1/4" × 1" |
| 600 | Lock Nut | 1/4" |
| 610 | Bolt | 3/8" × 1 1/2" |
| 620 | Lock Nut | 3/8" |
| 630 | Tool Holder Top Horizontal Frame | 1/8" × 1" × 1" Square Tubing |
| 640 | Tool Holder Rear Vertical Frame | 1/8" × 1" × 1" Square Tubing |
| 650 | Tool Holder Bracket - Top | 1/4" × 2 1/2" Flat Bar |
| 660 | Locking Pin Hole | 5/8" Hole |
| 670 | Tongue Mounting Hole | 1/2" Hole |
| 680 | Rear Trailer Hitch Pin Hole | 5/8" Hole |
| 690 | Yard Tool Holder Hole | 2" Hole |
| 700 | Bottom Tool Holder Hole | 3/8" Hole |
| 710 | Thumb Screw Hole | 5/16" Hole |
| 720 | Hole For Receiver Pin | 5/8" Hole |
| 730 | Right Side Cotterless Hitch Hole | 1/4" Hole |
| 740 | Inside Cotterless Hitch Hole | 1/4" Hole |
| 750 | Receiver Pin | 5/8" Hole |
| 760 | Retaining Clip For Receiver | 1/8" |
| 770 | Trailer Hitch Pin | 1/2" |
| 780 | Trailer Hitch Retaining Clip | 1/8" |
| 790 | Mud Flap Bolt | 1/4" × 3/4" Bolt |
| 800 | Mud Flap Nut | 1/4" Nut |
| 810 | Tongue Assembly | |
| 820 | Trailer Assembly | |
| 830 | Spreader Lever Assembly | |
| 840 | Tool Holder Assembly | |

What is claimed is:

1. A selectively foldable ATV utility trailer comprising:
a frame portion having a forward end, a rearward end, opposite sides, an upper end, flooring, and a lower end, wherein said lower end is offset from said upper end;
a first wheel assembly and a second wheel assembly, securely attached to a bottom of said first frame portion, wherein said first wheel assembly and said second wheel assembly have horizontal pivotal means;
a slidably adjustable, elongated tongue member, having ATV securing means, wherein said tongue member has pivotal securing means about a vertical axis transverse to the longitudinal axis of said tongue member wherein said frame portion is selectively in ground-engagement to a substantially vertically disposed position rearwardly of the ATV;
a rear trailer hitch attaching means, and
an adjustable mud flap assembly.

2. The selectively foldable ATV utility trailer of claim 1, further comprising a releasably attached tool holder assembly.

3. The selectively foldable ATV utility trailer of claim 1, further comprising a releasably attached spreader assembly.

* * * * *